W. S. KINCAID.
Horse Hay-Rake.
No. 86,080.　　　　　　　　　　　　　Patented Jan. 19, 1869.
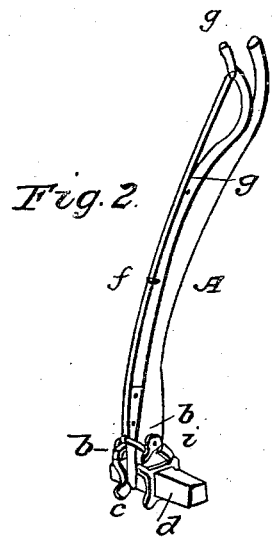
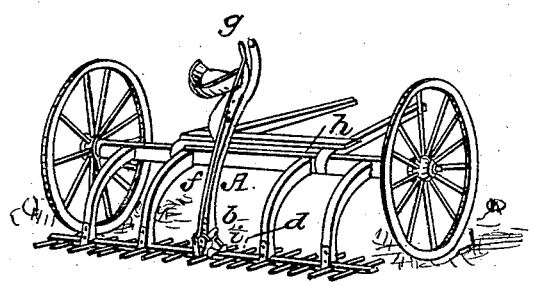
Witnesses
B Gray
G. H. English
Inventor
William S Kincaid

WILLIAM S. KINCAID, OF LEAVENWORTH COUNTY, KANSAS.

Letters Patent No. 86,080, dated January 19, 1869.

IMPROVEMENT IN HORSE HAY-RAKES.

The Schedule referred to in these Letters Patent and making part of the same.

*To whom it may concern:*

Be it known that I, WILLIAM S. KINCAID, of the county of Leavenworth, and State of Kansas, have invented a new and improved Hay-Rake; and I do hereby declare the following to be a full and exact description of the same.

The nature of my improvement consists in attaching to the shaft of the rake $d$, (reference being had to the drawing, fig. 1,) the lever A, with the apparatus for revolving the shaft, and which may be more fully seen in fig. 2.

$d$ is the shaft of the rake.

A, the lever.

$c\,c$, two square pieces of iron enclosing the shaft, with projections at each angle.

$b\,b$ are ratchets, attached to each side of the lever A, which holds the lever steady on the shaft, catching upon the projecting angles of $c\,c$.

The rod $f$ is attached to the ratchets by means of the arch I, and, at the top, to the spring $g$.

When the rake has filled with hay, the driver grasps the handle $g$, and presses forward the same, which throws the points of the teeth downward, and causes the rear ratchet to rise, and permits the rake to make half of a revolution.

I claim a further improvement in the manner provided for transporting the rake, which can be done by pressing forward the lever until the rake is elevated nearly over the axle, where it is caught by catch $h$ attached to cross-piece of the shafts, and is there supported as long as desired.

The rake is firmly attached to the axle by arms, and the shafts or thills revolve on the axle.

What I claim as my invention, and desire to secure by Letters Patent, is—

1. The pivoted ratchet or stops $h\,i$, in combination with the stop-plate $c$, or its equivalent, substantially as and for the purposes set forth.

2. The spring-lever $f\,g$, in combination with the ratchets or stops, substantially as and for the purpose set forth.

3. The combination of the lever A, rake-head D, spring-stop $h$, and main axle, so arranged that the rake may be raised bodily by said lever in position by the same, or by the stop, substantially as described.

WILLIAM S. KINCAID.

Witnesses:
 GEO. H. ENGLISH,
 G. W. YEAGER.